United States Patent
Chou et al.

(10) Patent No.: US 11,973,641 B2
(45) Date of Patent: Apr. 30, 2024

(54) DEPLOYING EDGE COMPUTING

(71) Applicant: Intel Corporation, Santa Clara, CA (US)

(72) Inventors: Joey Chou, Scottsdale, AZ (US); Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/091,632

(22) Filed: Dec. 30, 2022

(65) Prior Publication Data

US 2023/0132489 A1 May 4, 2023

Related U.S. Application Data

(62) Division of application No. 15/734,532, filed as application No. PCT/US2019/058749 on Oct. 30, 2019, now Pat. No. 11,575,564.

(60) Provisional application No. 62/753,834, filed on Oct. 31, 2018.

(51) Int. Cl.
*H04L 41/0803* (2022.01)
*H04W 24/02* (2009.01)
*H04W 84/04* (2009.01)

(52) U.S. Cl.
CPC ......... *H04L 41/0803* (2013.01); *H04W 24/02* (2013.01); *H04W 84/042* (2013.01)

(58) Field of Classification Search
CPC .. H04L 41/0803; H04W 84/042; H04W 24/02
See application file for complete search history.

(56) References Cited

U.S. PATENT DOCUMENTS

| | | | |
|---|---|---|---|
| 2016/0219460 A1 | 7/2016 | Huang-Fu et al. | |
| 2018/0192471 A1* | 7/2018 | Li | H04W 4/50 |
| 2020/0296653 A1* | 9/2020 | Huang | H04W 40/00 |
| 2021/0243826 A1 | 8/2021 | Hoffman et al. | |
| 2021/0288886 A1 | 9/2021 | Ortenblad et al. | |
| 2022/0007251 A1 | 1/2022 | Allan et al. | |
| 2022/0086218 A1* | 3/2022 | Sabella | H04M 15/66 |

OTHER PUBLICATIONS

International Patent Office—International Search Report and Written Opinion dated Feb. 11, 2020 from International Application No. PCT/US2019/058749, 13 pages.
Tripathi, Dr. Nishith, "Network Slicing in 5G," 5G Prime, Award Solutions, Oct. 11, 2018, 7 pages.
Ravindran, et al., "Enabling ICN in 3GPP's 5G NextGen Core Architecture," ICNRG Internet-Draft, May 31, 2019, 13 pages.

(Continued)

*Primary Examiner* — Wayne H Cai
(74) *Attorney, Agent, or Firm* — Schwabe, Williamson & Wyatt, P.C.

(57) ABSTRACT

Techniques discussed herein can facilitate edge computing in connection with a variety of deployment scenarios. Various embodiments can facilitate one or more of: deploying UPF(s) (User Plane Function(s)) to support edge computing; removing UPF(s) not needed for edge computing; deploying local DN(s) (Data Network(s)); E2E (Edge-to-Edge) OSS (Operations Support System) deployment scenarios; and providing RAN (Radio Access Network) condition data to support various applications (e.g., autonomous driving).

17 Claims, 5 Drawing Sheets

(56) References Cited

OTHER PUBLICATIONS

Song, Pyong-Jung, "5G Network Slicing," ETRI, KRnet 2018, Jun. 26, 2018, 32 pages.
Cisco, "Cisco Network Services Orchestrator for Network Functions Virtualization (NFV)," NFV Orchestration with Cisco Network Services Orchestrator, Document ID: 1490044666393532, Mar. 20, 2017, 11 pages.
United States Patent Office—Office Action dated May 26, 2022, from U.S. Appl. No. 15/734,532, 9 pages.
United States Patent Office—Notice of Allowance dated Oct. 13, 2022, from U.S. Appl. No. 15/734,532, 8 pages.

* cited by examiner

DEPLOYING EDGE COMPUTING

REFERENCE TO RELATED APPLICATIONS

This application is a divisional application of U.S. application Ser. No. 15/734,532 filed Dec. 2, 2020, which is a national phase entry under 35 U.S.C. § 371 of Int'l App. No. PCT/US2019/058749 filed Oct. 30, 2019, which claims priority under 35 U.S.C. § 119(e) to U.S. Provisional App. No. 62/753,834 filed Oct. 31, 2018 the entire disclosures of each of which are hereby incorporated by reference.

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

Embodiments described herein can be implemented into a system using any suitably configured hardware and/or software. In various aspects, embodiments discussed herein can facilitate support of edge computing in connection with a variety of deployment scenarios.

Figure 1:
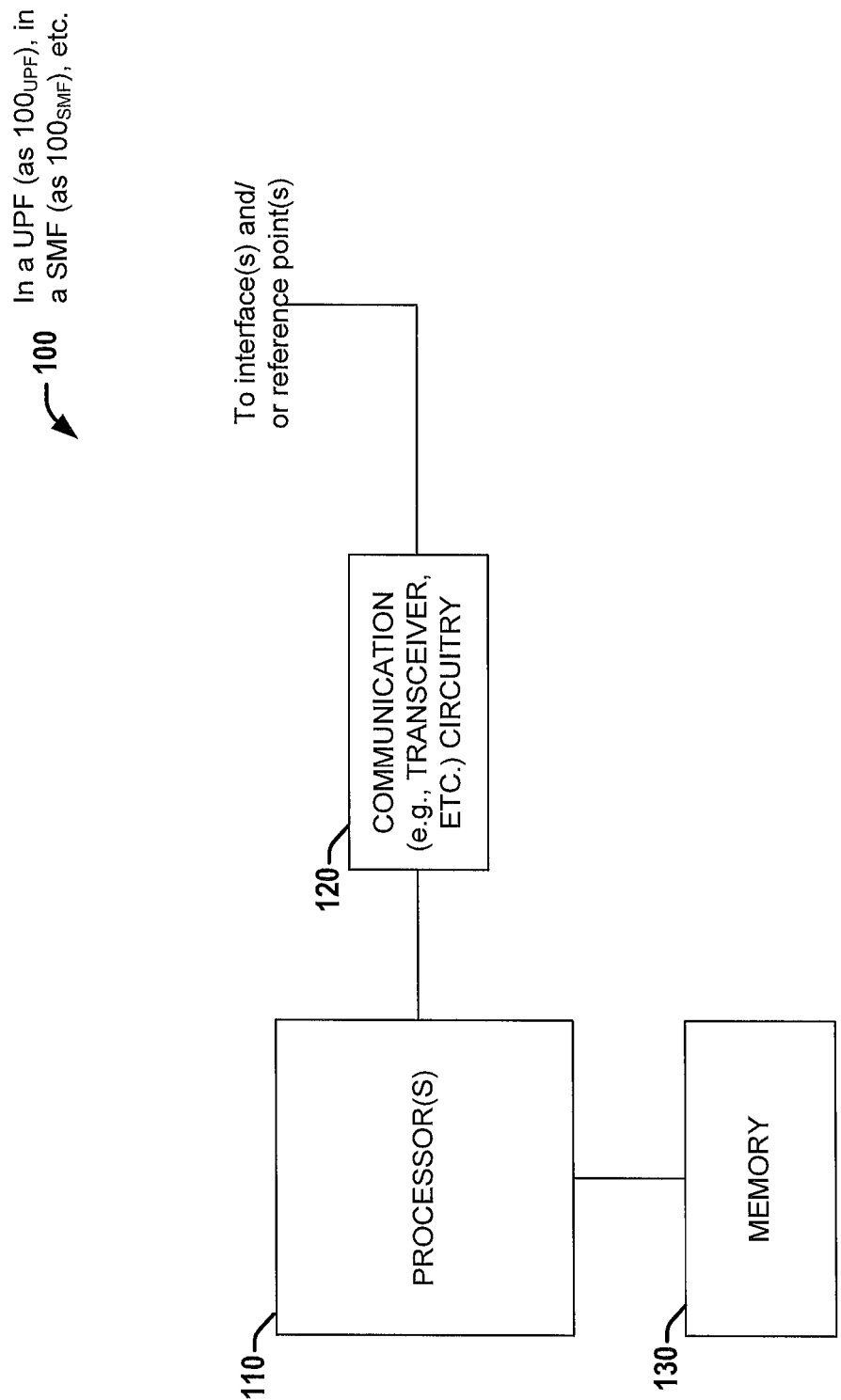
FIG. 1 is a block diagram illustrating a system that facilitates support of edge computing according to various deployment scenarios, in accordance with various embodiments discussed herein.

Referring to FIG. 1, illustrated is a block diagram of a system 100 employable at a component of a 3GPP (Third Generation Partnership Project) network or non-3GPP management system that facilitates support of edge computing applications in a variety of scenarios, in embodiments. System 100 can include processor(s) 110 comprising processing circuitry and associated interface(s) (e.g., a communication interface for communicating with communication circuitry 120, a memory interface for communicating with memory 130, etc.), communication circuitry 120 (e.g., comprising circuitry for wired and/or wireless connection(s), e.g., transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof), and a memory 130 (which can comprise any of a variety of storage mediums and can store instructions and/or data associated with one or more of processor(s) 110 or transceiver circuitry 120). Specific types of embodiments (e.g., UE embodiments) can be indicated via subscripts (e.g., system $100_{UE}$ comprising processor(s) $110_{UE}$, communication circuitry $120_{UE}$, and memory $130_{UE}$). In BS embodiments (e.g., system $100_{gNB}$) and network component (e.g., UPF (User Plane Function), etc.) embodiments (e.g., system $100_{UPF}$) processor(s) $110_{gNB}$ (etc.), communication circuitry $120_{gNB}$ (etc.), and memory $130_{gNB}$ (etc.) can be in a single device or can be included in different devices, such as part of a distributed architecture. In embodiments, signaling or messaging between different embodiments of system 100 (e.g., $100_1$ and $100_2$) can be generated by processor(s) $110_1$, transmitted by communication circuitry $120_1$ over a suitable interface or reference point (e.g., N4, etc.), received by communication circuitry $120_2$, and processed by processor(s) $110_2$.

The 5G (Fifth Generation) networks are intended to support various new services such as IoT (Internet of Things), Cloud-based services, industrial control, autonomous driving, mission critical communications, etc., based on the network slicing technology. Some services, for example, autonomous driving, have ultra-low latency and high data capacity targets (or requirements, etc.), due to safety and performance concerns. 5GC (5G Core Network) system architecture as defined in 3GPP (Third Generation Partnership Project) TS (Technical Specification) 23.501 supports edge computing to enable such services by applications that are hosted closer to the UE's access point of attachment in order to reduce the end-to-end latency and the load on the transport network.

Figure 2:
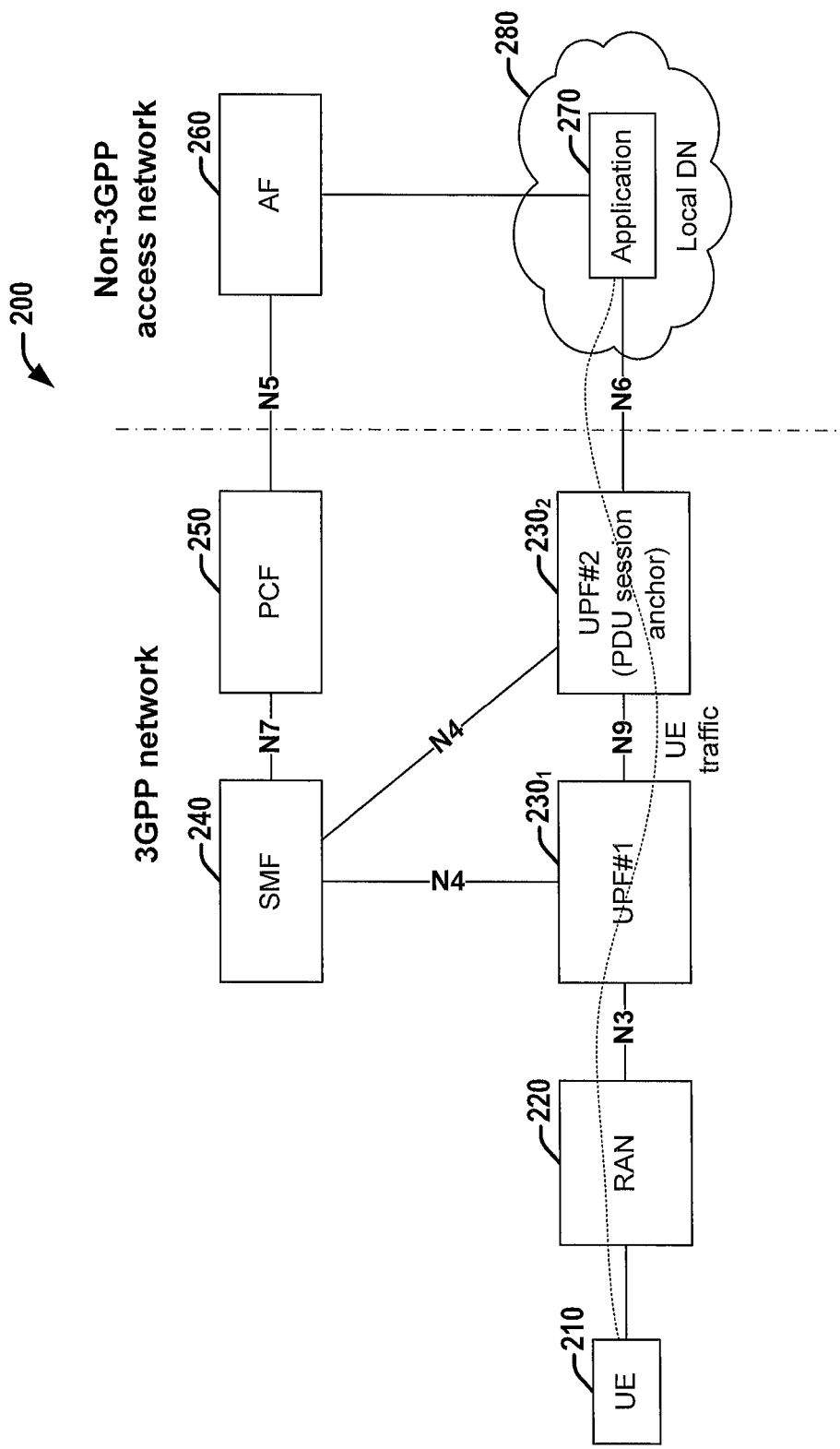
FIG. 2 is a diagram illustrating 3GPP network elements working with non-3GPP network elements to provide various services via edge computing, in connection with various aspects discussed herein.

Referring to FIG. 2, illustrated is a diagram showing how 3GPP network elements work with non-3GPP network elements, such as AF (Application Function) 260 and local DN (Data Network) 280 to provide various services (e.g., those discussed above, etc.) such as example application 270 via edge computing, in connection with various aspects discussed herein. The AF 260 can send requests to SMF (Session Management Function) 240 via PCF (Policy Function) 250 or NEF (Network Exposure Function) (not shown) to influence UPF (User Plane Function) $230_i$ (re)selection and traffic steering to route the UE 210 traffic from the selected UPF $230_i$ to the application 270 in the local Data Network 280 via the N6 reference point.

The end-to-end latency of the traffic traveling from UE 210 to local DN 280 includes the latency both inside the 3GPP network (e.g., RAN 220 and 5GC) and outside the 3GPP network. The latency within the 3GPP network is relevant to 5G QoS (Quality of Service), as described in clause 5.7.3.1 in TS 23.501, which is the QoS a data flow receives edge-to-edge between the UE 210 and the UPF $230_i$. The latency outside the 3GPP network is determined by the QoS over N6 reference point that is related to the geographical locations of UPF $230_i$ and local DN 280. Thus, it is important to deploy the local DN 280 and UPF $230_i$ in a manner that meets the end-to-end latency target(s) (or requirement(s), etc.) of the service(s).

Various embodiments discussed herein can facilitate operator deployment of UPF(s) and local DN(s) to support edge computing networks, in connection with various edge computing deployment scenarios. A first set of embodiments relate to E2E (End-to-End) OSS (Operations Support System) deployment scenarios, while a second set of embodiments relate to peer-to-peer edge computing management deployment scenarios. In connection with these embodiments and scenarios, use cases and capabilities (e.g., or requirements, etc.) are discussed herein, comprising: (a) Deploying UPF(s) to support edge computing; (b) Removing UPF(s) not needed for edge computing; (c) Local DN deployment; (d) E2E OSS deployment scenarios; and (e) RAN condition data.

Edge Computing Deployment Scenarios

Figure 3:
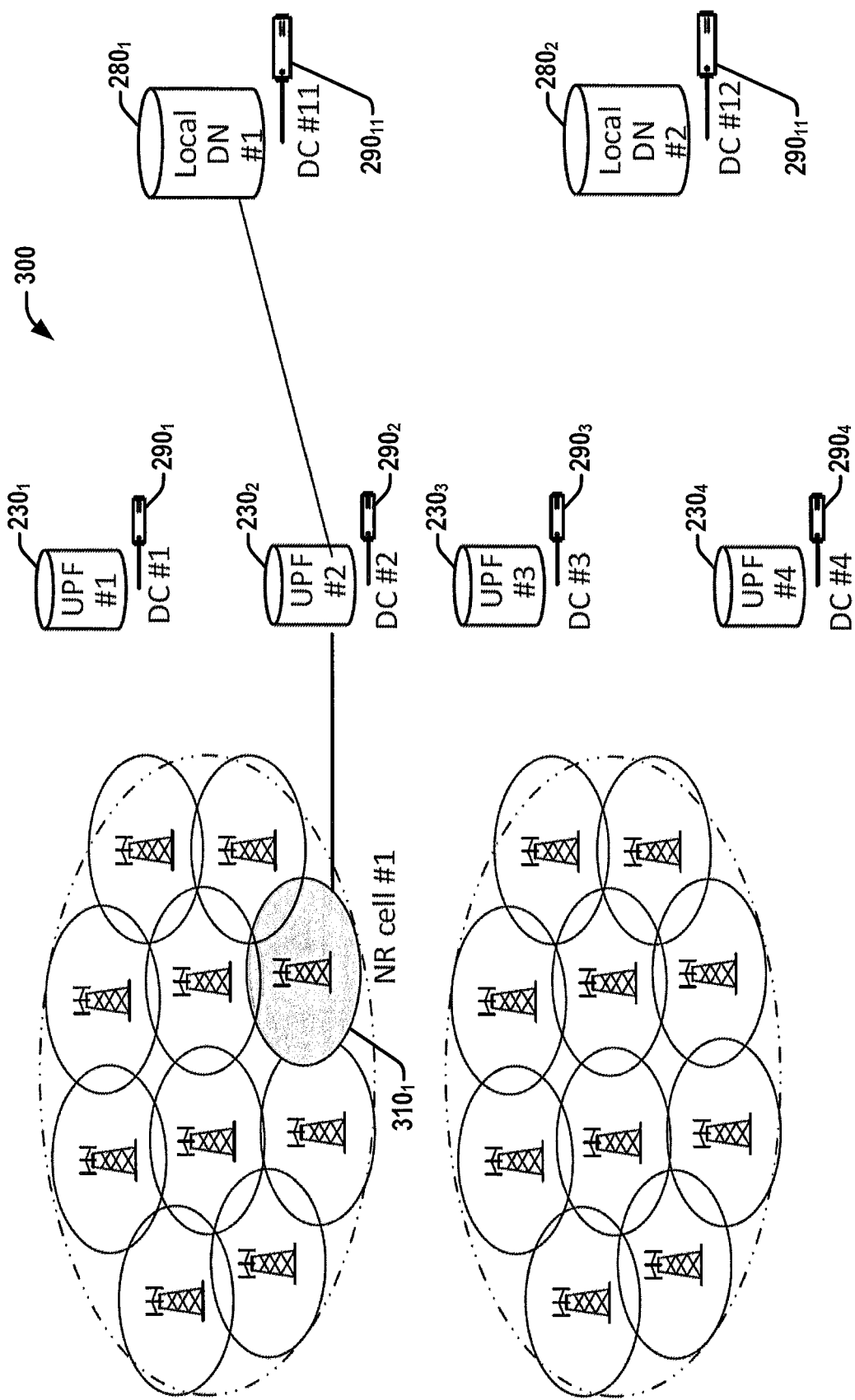
FIG. 3 is a diagram illustrating an example scenario of an edge computing network deployment, in connection with various aspects discussed herein.

Referring to FIG. 3, illustrated is an example scenario 300 of an edge computing network deployment, in connection with various aspects discussed herein. In scenario 300, NR cells $310_i$ and data centers DC #1-#4 ($290_1$-$290_4$), DC #11-#12 ($290_{11}$-$290_{12}$) have been deployed. When an operator decides to deploy an edge computing application for UEs connected to NR cell #1 $310_1$, it can select DC #2 $290_2$ to deploy UPF #2 $230_2$, and DC #11 $290_{11}$ to deploy local DN #1 $280_1$, based on the QoS targets (or requirements, etc.) between UEs and local DN #1 $280_1$ that meet the end-to-end QoS targets (or requirements, etc.) imposed by the application. The operator can connect UPF #2 $230_2$ to local DN #1 $280_1$ via virtual link, as shown in FIG. 3.

The deployment of network functions in 3GPP networks and non-3GPP networks to support edge computing involves communication between 3GPP management system and non-3GPP management systems, such as ETSI (European Telecommunications Standards Institute) NFV (Network Function Virtualization) MANO (Management and Orchestration) and ETSI MEC (Multi-Access Edge Computing).

E2E OSS Deployment Scenario

Figure 4:
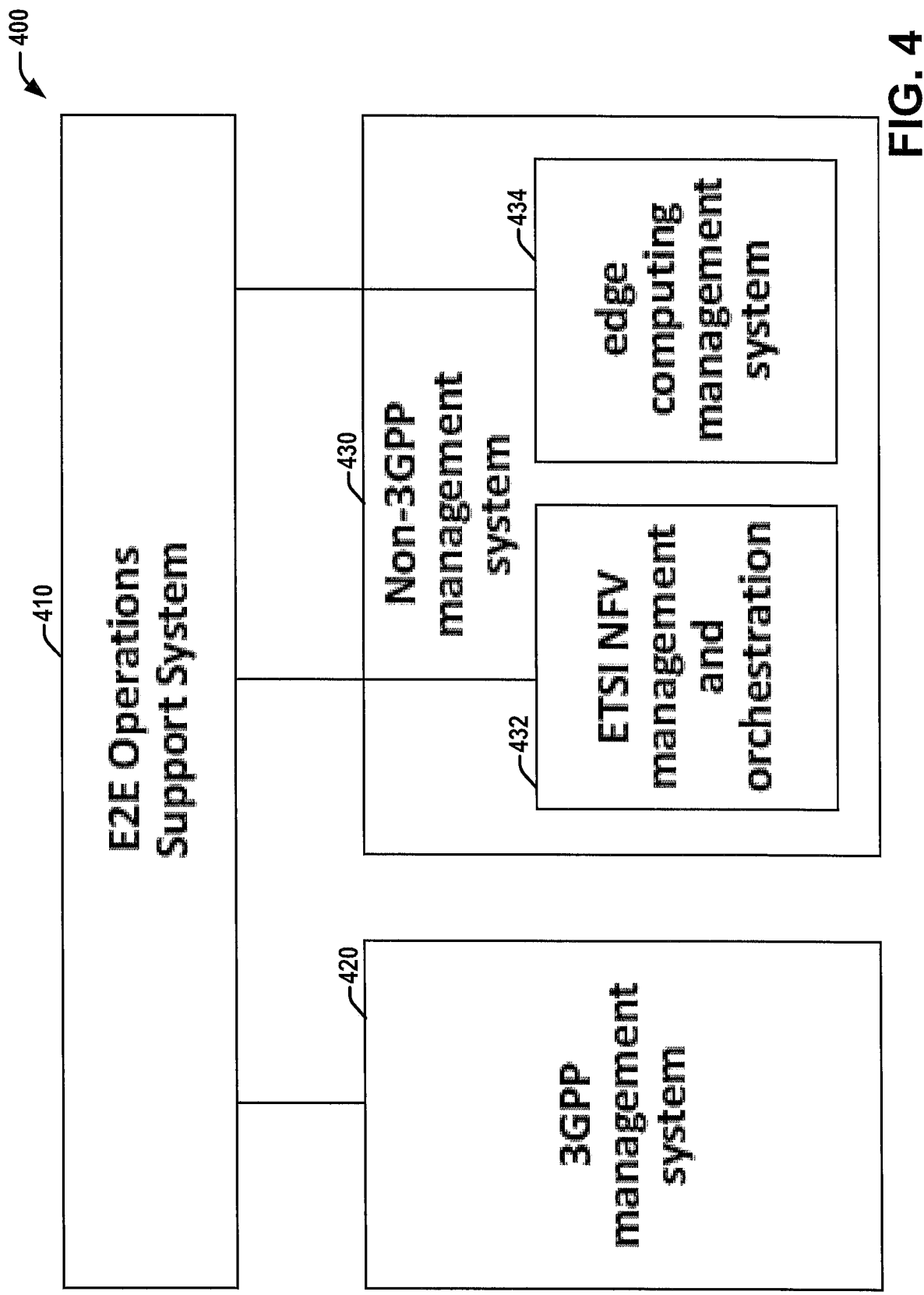
FIG. 4 is a diagram illustrating an example E2E (End-to-End) OSS (Operations Support System) edge computing deployment scenario, in connection with various aspects discussed herein.

Referring to FIG. 4, illustrated is a diagram of an example E2E (End-to-End) OSS (Operations Support System) deployment scenario 400, in connection with various aspects discussed herein. In example deployment scenario 400, E2E OSS 410 is responsible for coordination among the 3GPP management system 420, non-3GPP management systems 430, which can comprise edge computing (e.g., ETSI MEC) management system 432 responsible for the management of AF (e.g., 260) and local DN (e.g., $280_i$), and ETSI NFV MANO 434 to support the deployment of edge computing in 3GPP networks.

E2E OSS 410 can comprise information (e.g., e2e QoS requirements of edge computing applications, the topology of the UPF $230_i$ and local DN $280_i$, etc.) that facilitates deployment of the edge computing network. E2E OSS 410 is responsible for dividing the e2e QoS requirements into 5G QoS for 3GPP networks and QoS over N6 for non-3GPP networks, and setting up the connection between UPF $230_i$ and local DN $280_i$. In various aspects, E2E OSS 210 can communicate with: (1) 3GPP management system 420 to instantiate and configure the 3GPP NFs (e.g. UPF); (2) Non-3GPP edge computing management system 434 to instantiate and configure the local DN $280_i$; and (3) Non-3GPP ETSI NFVO 432 to establish and manage the connection between the UPF $230_i$ and local DN $280_i$, with the corresponding QoS targets (or requirements, etc.).

Peer-to-Peer Edge Computing Management Deployment Scenario

Figure 5:
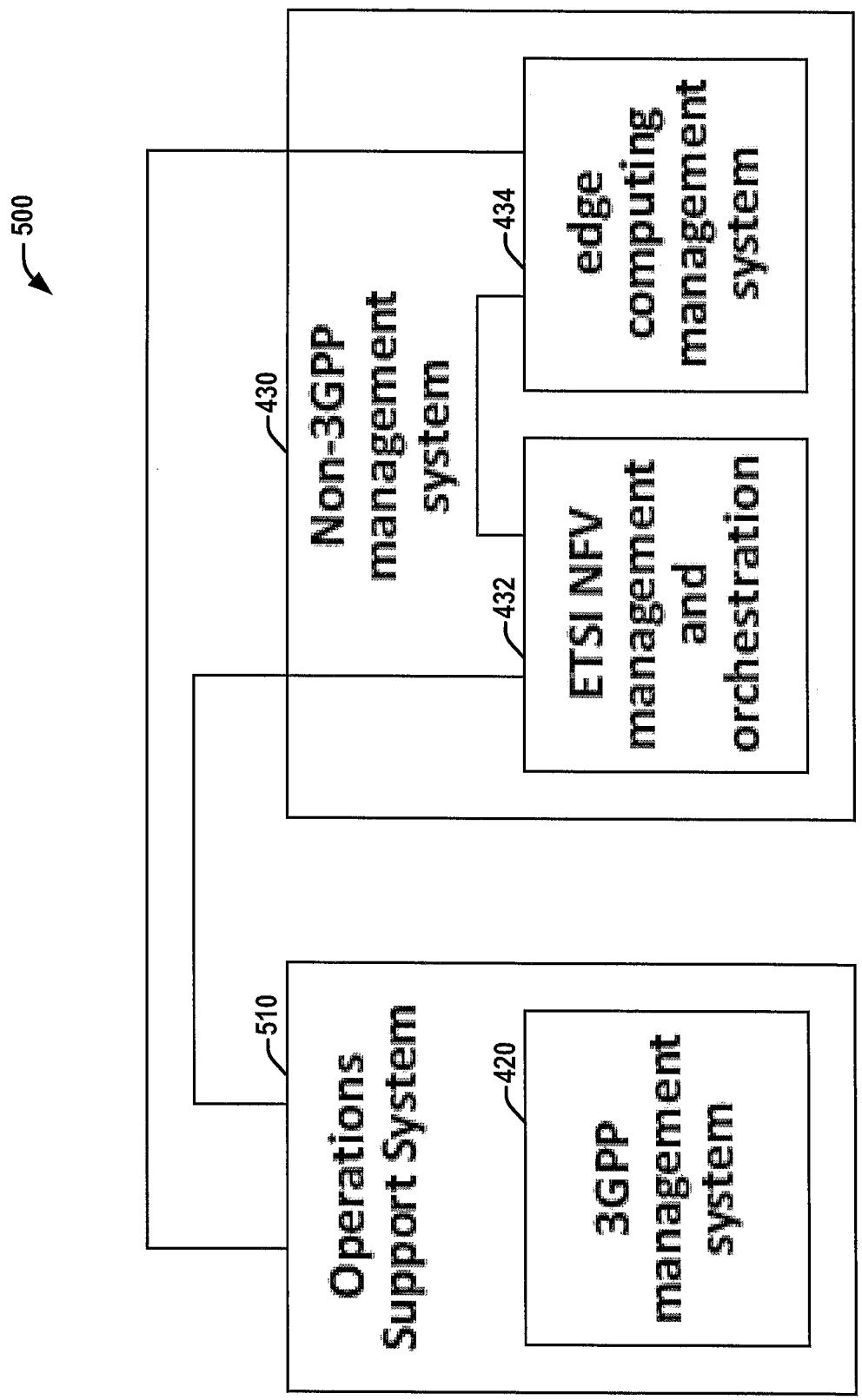
FIG. 5 is a diagram illustrating an example peer-to-peer edge computing deployment scenario, in connection with various aspects discussed herein.

Referring to FIG. 5, illustrated is an example peer-to-peer edge computing management deployment scenario 500, in connection with various aspects discussed herein. In example scenario 500, the deployment of edge computing in 3GPP networks involves communication among 3GPP management system 420 (e.g., within OSS 510), non-3GPP management system 430, which can comprise edge computing management system 434 and ETSI NFV MANO 432.

In some aspects, 3GPP management system 420 can initiate the edge computing deployment by requesting the edge computing management system 434 to deploy the local DN $280_i$, and NFVO (NFV Orchestrator) of NFV MANO 432 to connect the UPF $230_i$ and local DN $280_i$ with the QoS over N6 requirements for the connection (e.g. virtual link) between UPF $230_i$ and local DN $280_i$.

In other aspects, edge computing management system 434 can initiate the edge computing deployment by requesting the 3GPP management system 420 to deploy the UPF $230_i$, and NFVO of NFV MANO 432 to connect the UPF $230_i$ and local DN $280_i$ with the QoS target(s) (or requirement(s), etc.) for the connection between UPF $230_i$ and local DN $280_i$.

Example Use Cases

Deploy UPF to Support Edge Computing

Introduction: An operator decides to deploy UPF(s) (e.g., $230_i$) to support edge computing application(s) for UE(s) in a specific area. The UPF(s) can be deployed in locations where the data transported between UE and UPF can meet the 5G QoS targets (or requirements, etc.).

Pre-conditions: the 3GPP management system (e.g., 420) has received the 5G QoS targets (or requirements, etc.) of the edge computing application (e.g., 270).

Description: (1) 3GPP management system requests NFVO (e.g., of NFV MANO 432) to instantiate the UPF (e.g., $230_i$) at a location that is determined by the 5G QoS targets (e.g., or requirements); (2) NFVO responds that the UPF has been instantiated successfully; and (3) 3GPP management system configures SMF (e.g., 240) to add the newly instantiated UPF to the UPF list with the UPF location to assist UPF selection for traffic steering.

Post-conditions: The UPF is available to support the edge computing application.

Remove UPF not Needed for Edge Computing

Introduction: An operator decides to remove a UPF (e.g., $230_i$) that is no longer needed to support edge computing applications.

Pre-conditions: UPF supporting edge computing application has been instantiated.

Description: (1) 3GPP management system (e.g., 420) requests NFVO (e.g., of NFV MANO 432) to terminate the UPF; (2) NFVO responds that the UPF has been terminated successfully; and (3) 3GPP management system configures SMF (e.g., 240) to remove the UPF that has been terminated from a UPF list serving the edge computing.

Post-conditions: The UPF is not available to support the edge computing application.

Local DN Deployment

Introduction: An operator decides to deploy the local DN (e.g., $280_i$) to connect to the UPF (e.g., $230_i$) that has been instantiated to support edge computing. The local DN should be deployed in locations where the data transported between UPF and local DN should meet the QoS targets (e.g., or requirements, etc.) over N6 interface.

Pre-conditions: 3GPP management system has received the QoS targets (e.g., or requirements, etc.) over N6 interface. The UPF supporting the edge computing application (e.g., 270), has been instantiated.

Description: (1) 3GPP management system (e.g., 420) requests the edge computing management system (e.g., 434) to deploy the local DN (e.g., 280$_i$) with the QoS targets (e.g., or requirements, etc.) over N6 interface, and UPF information (e.g., the identifier of the UPF being instantiated, the location of the data center where the UPF is hosted); (2) Edge computing management system selects the data center (e.g., 290$_i$) where the local DN will be instantiated, based on the QoS targets (e.g., or requirements) and UPF location, and interacts with NFVO (e.g., of NFV MANO 432) to instantiate the local DN in such data center; (3) Edge computing management system responds to 3GPP management system with the identifier of the local DN being instantiated, after NFVO indicating that the local DN has been instantiated successfully; and (4) 3GPP management system requests NFVO to connect the UPF to local DN with the QoS targets (e.g., or requirements) over N6 interface.

Post-conditions: UEs are able to communicate with the local DN to run the edge computing application.

E2E OSS Deployment Scenario

Introduction: This use case is to support the E2E OSS (e.g., 410) deployment scenario. An operator decides to deploy the local DN (e.g., 280$_i$) and UPF (e.g., 230$_i$) to support edge computing applications (e.g., 270) for UEs located in a specific area. E2E OSS derives the 5G QoS and QoS over N6 interface requirements from e2e QoS requirements.

Pre-conditions: The NR cells (e.g., 310$_i$) where UEs are connected to run the edge computing applications (e.g., 270) have been deployed.

Description: (1) E2E OSS requests 3GPP management system to deploy the UPF with 5G QoS targets (e.g., or requirements) in a specific area; (2) 3GPP management system (e.g., 420) selects the data center (e.g., 290$_i$) where the UPF will be instantiated, based on the 5G QoS targets (e.g., or requirements), and interacts with NFVO (e.g., of NFV MANO 432) to instantiate the UPF in such data center; (3) 3GPP management system responds to E2E OSS with the identifier and the location of the UPF being instantiated, after NFVO indicating that the UPF has been instantiated successfully; (4) E2E OSS requests non-3GPP edge computing management system (e.g., 434) to deploy the local DN with the QoS over N6 requirements, and the UPF location; (5) Non-3GPP edge computing management system selects the data center where the local DN will be instantiated, based on the QoS over N6 targets (e.g., or requirements) and UPF location, and interacts with NFVO to instantiate the local DN in such data center; (6) Non-3GPP edge computing management system responds to E2E OSS with the identifier of the local DN being instantiated, after NFVO responds that the AS has been instantiated successfully; and (7) E2E OSS requests NFVO to connect UPF to local DN with the non-3GPP networks QoS requirements.

Post-conditions: UEs are able to communicate with the local DN to run the edge computing application.

RAN Condition Data

Introduction: Self-driving cars communicate with applications hosted in the edge computing based on ultra-low latency and high reliability connections as they travel to the destinations. Any service interruption in NR cells (e.g., 310$_i$) along the way where the cars are traveling can cause issues, including property damage or even bodily injury. 3GPP management system (e.g., 420) analyzes performance data, alarms, and provisioning data of NR cells to generate RAN condition data indicating the issues of a NR cell before the cars reach that NR cell. 3GPP management system then reports to edge computing management system (e.g., 434) the RAN condition data that can be consumed by edge computing application to re-route cars when it foresees certain cells are experiencing issues. For example, if a cell is overloaded with user traffic, experiencing an outage, or not able to support the ultra-low latency requirement, then this cell should not be in the route.

Pre-conditions: An edge computing application is running to support autonomous driving.

Description: (1) 3GPP management system collects and analyzes performance data, alarms, and provisioning data of NR cells; (2) 3GPP management system generates RAN condition data that comprises but is not limited to the following value to represent the condition of a NR cell (0: healthy; 1: out of service; 2: capacity constraint (e.g. overloaded); 3: capability constraint (e.g. does not support ultra-low latency requirement)); and (3) 3GPP management system provides the RAN condition data to edge computing management system to support autonomous driving.

Post-conditions: Edge computing application uses the RAN condition data to assist the auto navigation.

Potential Capabilities or Requirements

In various embodiments, one or more of the following capabilities or requirements can be employed by a 3GPP management system.

REQ-ECM_CON-w: The 3GPP management system can have a capability to instantiate the UPF at the location that meets the 5G QoS requirements.

REQ-ECM_CON-x: The 3GPP management system can have a capability to configure the SMF to add an UPF to the UPF list with the UPF location to assist UPF selection for traffic steering.

REQ-ECM_CON-y: The 3GPP management system can have a capability to terminate the UPF that has been supporting the edge computing.

REQ-ECM_CON-z: The 3GPP management system can have a capability to configure the SMF to remove the UPF to the UPF list serving the edge computing.

REQ-ECM_CON-x: The 3GPP management system can have a capability for requesting edge computing management system to deploy local DN based on QoS requirements over N6 interface, and the UPF location.

REQ-ECM_CON-y: The 3GPP management system can have a capability for requesting NFVO to connect UPF to the local DN based on QoS requirements over N6 interface.

REQ-ECM_CON-x: The 3GPP management system can have a capability allowing E2E OSS to deploy UPF based on 5G QoS.

REQ-ECM_CON-x: 3GPP management system can have a capability to provide RAN condition data to edge computing management system to support autonomous driving.

Additional Embodiments

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

A first example embodiment is an E2E OSS (Operations Support System) comprising one or more processors configured to: request a 3GPP management system to deploy the UPF with the 5G QoS targets (e.g., or requirements) in a specific location; receive the response from 3GPP management system with the identifier and the location of the UPF being instantiated; request non-3GPP edge computing management system to deploy the Local DN with the QoS targets (e.g., or requirements) over N6 interface, and the UPF location; receive the response from non-3GPP edge computing management system with the identifier of the local DN being instantiated; and request NFVO to connect UPF to local DN with the QoS targets (e.g., or requirements) over N6 interface.

A second example embodiment comprises the first example embodiment, wherein the 3GPP management system comprises one or more processors configured to: select the data center where the UPF will be instantiated, based on the 5G QoS targets (e.g., or requirements) and the location of NR cells; and request NFVO to instantiate the UPF in such data center identified in the above step; and receive a response from NFVO with the identifier of UPF to indicate the UPF has been instantiated.

A third example embodiment comprises the second example embodiment, wherein upon receiving a response from NFVO, the 3GPP management system is configured to respond to E2E OSS with the identifier and the location of the UPF being instantiated, after the UPF has been instantiated successfully.

A fourth example embodiment comprises the first example embodiment, wherein the non-3GPP edge computing management system comprises one or more processors configured to: receive a request from 3GPP management system to deploy the local DN with the QoS targets (e.g., or requirements) over N6 interface, and UPF information (e.g. the identifier of the UPF being instantiated, the location of the data center where the UPF is hosted); select the data center where the local DN will be instantiated, based on the QoS targets (e.g., or requirements) and the location of UPF; request NFVO to instantiate the local DN in such data center identified in the above step; and receive a response from NFVO with the identifier of local DN to indicate the UPF has been instantiated.

A fifth example embodiment comprises the fourth example embodiment, wherein upon receiving a response from NFVO, the non-3GPP edge computing management system is configured to respond to 3GPP management system with the identifier of the local DN being instantiated.

A sixth example embodiment comprises any of the first through fifth example embodiments, wherein the edge computing applications are hosted in the local DN that is closer to the UE's access point of attachment or RAN in order to reduce the end-to-end latency and the load on the transport network by the edge computing application.

A seventh example embodiment is a 3GPP management system comprising one or more processors configured to: receive a request with the 5G QoS targets (e.g., or requirements) to deploy the UPF in a specific location; select the data center where the UPF will be instantiated, based on the 5G QoS targets (e.g., or requirements); request NFVO to instantiate the UPF in such data center identified in the above step; receive a response from NFVO with the identifier of UPF to indicate the UPF has been instantiated; and configure SMF to add the newly instantiated UPF to the UPF list with the UPF location to assist UPF selection for traffic steering.

An eighth example embodiment is a 3GPP management system comprising one or more processors configured to: receive a request with to terminate the UPF; request NFVO to terminated the UPF; receive a response from NFVO with the identifier of UPF to indicate the UPF has been terminated; and configure SMF to remove the UPF that has been terminated from UPF list serving the edge computing.

A ninth example embodiment is a 3GPP management system comprising one or more processors configured to: collect and analyzes performance data, alarms, and provisioning data of NR cells; generate RAN condition data that include but not limited to the following value to represent the condition of a NR cell (0: healthy; 1: out of service 2: capacity constraint (e.g. overloaded); 3: capability constraint (e.g. does not support ultra-low latency requirement)); provide the RAN condition data to edge computing management system to support autonomous driving.

The following are additional example embodiments.

Example 1 is an apparatus configured to be employed in a 3GPP (Third Generation Partnership Project) management system, comprising: a memory interface; and processing circuitry configured to: generate a first request for a NFVO (NFV (Network Function Virtualization) Orchestrator) to instantiate a UPF (User Plane Function) at a location that is determined by 5G (Fifth Generation) QoS (Quality of Service) requirements; process a first response from the NFVO indicating that the UPF has been instantiated successfully; and configure a SMF (Session Management Function) to add the UPF to a UPF list with a location of the UPF.

Example 2 comprises the subject matter of any variation of any of example(s) 1, wherein the UPF list facilitates UPF selection for traffic steering.

Example 3 comprises the subject matter of any variation of any of example(s) 1-2, wherein the processing circuitry is further configured to process the 5G QoS requirements, wherein the 5G QoS requirements are associated with the connection between a UE (User Equipment) and the UPF.

Example 4 comprises the subject matter of any variation of any of example(s) 3, wherein the 5G QoS requirements are derived from end-to-end QoS requirements from the UE to an edge computing application, and received via an additional request that is associated with the edge computing application.

Example 5 comprises the subject matter of any variation of any of example(s) 4, wherein the additional request indicates the location.

Example 6 comprises the subject matter of any variation of any of example(s) 1-5, wherein the processing circuitry is further configured to: generate a second request for the NFVO to terminate the UPF; process a second response from the NFVO indicating that the UPF has been terminated successfully; and configure the SMF to remove the UPF from the UPF list.

Example 7 is an apparatus configured to be employed in a 3GPP (Third Generation Partnership Project) management system, comprising: a memory interface; and processing circuitry configured to: generate a first request for an edge computing management system to deploy a local DN (Data Network), wherein the first request comprises QoS (Quality of Service) requirements and information associated with a UPF (User Plane Function); process a response from the edge computing management system, wherein the response comprises an identifier of the local DN; and generate a second request for a NFVO (Network Function Virtualization Orchestrator) to connect the UPF to the local DN over an N6 interface based on the QoS requirements.

Example 8 comprises the subject matter of any variation of any of example(s) 7, wherein the information associated with the UPF comprises at least one of an identifier of the UPF or a location of a data center where the UPF is hosted.

Example 9 comprises the subject matter of any variation of any of example(s) 7-8, wherein the UPF was instantiated to support one or more edge computing applications.

Example 10 comprises the subject matter of any variation of any of example(s) 7-9, wherein the QoS requirements comprise QoS requirements for the N6 interface.

Example 11 is an apparatus configured to be employed in an edge computing management system, comprising: a memory interface; and processing circuitry configured to: process a request from a 3GPP (Third Generation Partnership Project) management system to deploy a local DN (Data Network), wherein the request comprises QoS (Quality of Service) requirements and information associated with a UPF (User Plane Function); select a data center where the local DN will be instantiated, based on the QoS requirements and the information associated with the UPF; interact with a NFVO (Network Function Virtualization Orchestrator) to instantiate the local DN in the selected data center; receive an indication from the NFVO that the local DN has been instantiated successfully; and generate a response for the 3GPP management system, wherein the response comprises an identifier of the local DN.

Example 12 comprises the subject matter of any variation of any of example(s) 11, wherein the information associated with the UPF comprises at least one of an identifier of the UPF or a location of a data center where the UPF is hosted.

Example 13 comprises the subject matter of any variation of any of example(s) 11-12, wherein the UPF was instantiated to support one or more edge computing applications.

Example 14 comprises the subject matter of any variation of any of example(s) 11-13, wherein the QoS requirements comprise QoS requirements for the N6 interface.

Example 15 is an apparatus configured to be employed in a 3GPP (Third Generation Partnership Project) management system, comprising: a memory interface; and processing circuitry configured to: collect data associated with one or more NR (New Radio) cells of a RAN (Radio Access Network); analyze the collected data; generate RAN condition data based on the analyzed data; and provide the RAN condition data to an edge computing management system.

Example 16 comprises the subject matter of any variation of any of example(s) 15, wherein the data associated with a set of NR cells of a RAN comprises one or more of performance data, alarm data, or provisioning data.

Example 17 comprises the subject matter of any variation of any of example(s) 15, wherein the RAN condition data comprises, for a first NR cell of the set of NR cells, an associated value that represents a condition of the first NR cell.

Example 18 comprises the subject matter of any variation of any of example(s) 17, wherein the associated value indicates whether the condition of the first NR cell is one of: healthy, out of service, capacity constrained, or capability constrained.

Example 19 comprises the subject matter of any variation of any of example(s) 15-18, wherein the processing circuitry is configured to analyze the collected data based on requirements associated with an edge computing application.

Example 20 comprises the subject matter of any variation of any of example(s) 19, wherein the edge computing application comprises auto-navigation associated with autonomous driving.

Example 21 is an apparatus configured to be employed in a NFVO (Network Function Virtualization Orchestrator), comprising: a memory interface; and processing circuitry configured to: process a request from a 3GPP (Third Generation Partnership Project) management system to instantiate a UPF (User Plane Function) at a location that is determined by 5G (Fifth Generation) QoS (Quality of Service) requirements; instantiate the UPF at the location in response to the request; and generate a response for the 3GPP management system indicating that the UPF has been instantiated successfully.

Example 22 comprises the subject matter of any variation of any of example(s) 21, wherein the 5G QoS requirements are associated with an edge computing application.

Example 23 is an apparatus configured to be employed in an E2E (End-to-End) OSS (Operations Support System), comprising: a memory interface; and processing circuitry configured to: generate a first request for a 3GPP (Third Generation Partnership Project) management system to deploy a UPF (User Plane Function) based on 5G (Fifth Generation) QoS (Quality of Service) requirements in an area; process a first response from the 3GPP management system, wherein the first response comprises an identifier of the UPF and a location of the UPF; generate a second request for a non-3GPP edge computing management system to deploy a local DN (Data Network) based on QoS requirements for an N6 interface, wherein the second request indicates the location of the UPF; process a second response from the non-3GPP edge computing management system, wherein the second response comprises an identifier of the local DN; and generate a third request for a NFVO (Network Function Virtualization Orchestrator) to connect the UPF to the local DN based on the QoS requirements for the N6 interface.

Example 24 is an apparatus configured to be employed in a 3GPP (Third Generation Partnership Project) management system, comprising: a memory interface; and processing circuitry configured to: generate a request for a NFVO (NFV (Network Function Virtualization) Orchestrator) to terminate a UPF (User Plane Function); process a response from the NFVO indicating that the UPF has been terminated successfully; and configure a SMF (Session Management Function) to remove the UPF from a UPF list.

Example 25 comprises the subject matter of any variation of any of example(s) 24, wherein the UPF list facilitates UPF selection for traffic steering for one or more edge computing applications.

Example 26 comprises the subject matter of any variation of any of example(s) 24, wherein the response comprises an identifier of the UPF.

Example 27 comprises an apparatus comprising means for executing any of the described operations of examples 1-26.

Example 28 comprises a machine readable medium that stores instructions for execution by a processor to perform any of the described operations of examples 1-26.

Example 29 comprises an apparatus comprising: a memory interface; and processing circuitry configured to: perform any of the described operations of examples 1-26.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature can be combined with one or more other features of the other implementations as may be desired and advantageous for any given or particular application.

What is claimed is:

1. An apparatus configured to be employed in a Third Generation Partnership Project (3GPP) management system, comprising:
a memory interface; and
processing circuitry configured to:
generate a first request for an edge computing management system to deploy a local Data Network (DN), wherein the first request comprises Quality of Service (QoS) requirements and information associated with a User Plane Function (UPF);
process a response from the edge computing management system, wherein the response comprises an identifier of the local DN; and
generate a second request for a Network Function Virtualization Orchestrator (NFVO) to connect the UPF to the local DN over an N6 interface based on the QoS requirements.

2. The apparatus of claim 1, wherein the information associated with the UPF comprises at least one of an identifier of the UPF or a location of a data center where the UPF is hosted.

3. The apparatus of claim 1, wherein the UPF was instantiated to support one or more edge computing applications.

4. The apparatus of claim 1, wherein the QoS requirements comprise QoS requirements for the N6 interface.

5. The apparatus of claim 1, wherein the QoS requirements include QoS requirements for one or more edge computing applications.

6. The apparatus of claim 1, wherein the processing circuitry is configured to:
receive the QoS requirements over the N6 interface.

7. The apparatus of claim 1, wherein the processing circuitry is configured to:
send the first request to the edge computing management system.

8. The apparatus of claim 1, wherein the processing circuitry is configured to:
send the second request to the NFVO; and
receive a response from the NFVO, wherein the response from the NFVO indicates whether the UPF has successfully connected to the local DN over the N6 interface.

9. A non-transitory computer readable medium (NTCRM) comprising instructions for operating a Third Generation Partnership Project (3GPP) management system, wherein execution of the instructions by one or more processors is to cause the 3GPP management system to:
generate a first request for an edge computing management system to deploy a local Data Network (DN), wherein the first request includes Quality of Service (QoS) requirements and information associated with a User Plane Function (UPF);
process a response from the edge computing management system, wherein the response includes an identifier of the local DN; and
generate a second request for a Network Function Virtualization Orchestrator (NFVO) to connect the UPF to the local DN over an N6 interface based on the QoS requirements.

10. The NTCRM of claim 9, wherein the information associated with the UPF includes at least one of an identifier of the UPF or a location of a data center where the UPF is hosted.

11. The NTCRM of claim 9, wherein the UPF was instantiated to support one or more edge computing applications.

12. The NTCRM of claim 9, wherein the QoS requirements include QoS requirements for the N6 interface.

13. The NTCRM of claim 9, wherein the QoS requirements include QoS requirements for one or more edge computing applications.

14. The NTCRM of claim 9, wherein execution of the instructions is to cause the 3GPP management system to:
send the first request to the edge computing management system.

15. The NTCRM of claim 9, wherein execution of the instructions is to cause the 3GPP management system to:
send the second request to the NFVO; and
receive a response from the NFVO, wherein the response from the NFVO indicates whether the UPF has successfully connected to the local DN over the N6 interface.

16. The NTCRM of claim 9, wherein execution of the instructions is to cause the 3GPP management system to:
select a data center where the UPF is to be instantiated based on the QoS requirements; and
interact with the NFVO to instantiate the UPF in the selected data center.

17. The NTCRM of claim 9, wherein execution of the instructions is to cause the 3GPP management system to:
analyze data related to one or more cells, wherein the data related to the one or more cells includes performance data, alarms, and provisioning data;
generate radio access network (RAN) condition data based on the analyzed data, wherein the RAN condition data indicates a condition of individual cells of the one or more cells, and the RAN condition data includes a healthy value, an out-of-service value, a capacity constraint value, and a capability constraint value; and
provide the RAN condition data to the edge computing management system.

* * * * *